United States Patent

[11] 3,612,251

| [72] | Inventors | Frank A. Gory;<br>Clarence Peavy, both of Hallandale, Fla. |
|---|---|---|
| [21] | Appl. No. | 860,623 |
| [22] | Filed | Sept. 24, 1969 |
| [45] | Patented | Oct. 12, 1971 |
| [73] | Assignee | Gory Industries<br>Boca Raton, Fla. |

[54] PALLET FEEDER FOR A TILE-MOLDING MACHINE
7 Claims, 11 Drawing Figs.

[52] U.S. Cl. ................................................ 198/76,
198/164, 271/18
[51] Int. Cl. .................................................... B65g 15/14,
B65g 59/00
[50] Field of Search ......................................... 198/35, 76,
164, 34, 23; 214/7, 8.5 A, 8.5 K; 271/18

[56] References Cited
UNITED STATES PATENTS
2,611,470   9/1952   Rudolph .................... 198/35
FOREIGN PATENTS
1,068,137   5/1967   Great Britain ............... 198/23

*Primary Examiner*—Edward A. Sroka
*Attorney*—Lloyd J. Andres

ABSTRACT: An automatic mechanism for feeding tile-molding pallets onto a conveyor of an automatic tile-molding machine in predetermined precise sequential spaced relation from a stack of nested pallets positioned on a loading hopper in the mechanism including a power transmission driven by the molding machine for operating the feeding mechanism including an independent electric controlled mechanism for sequentially releasing the pallets on the conveyor in timed relation with the conveyor.

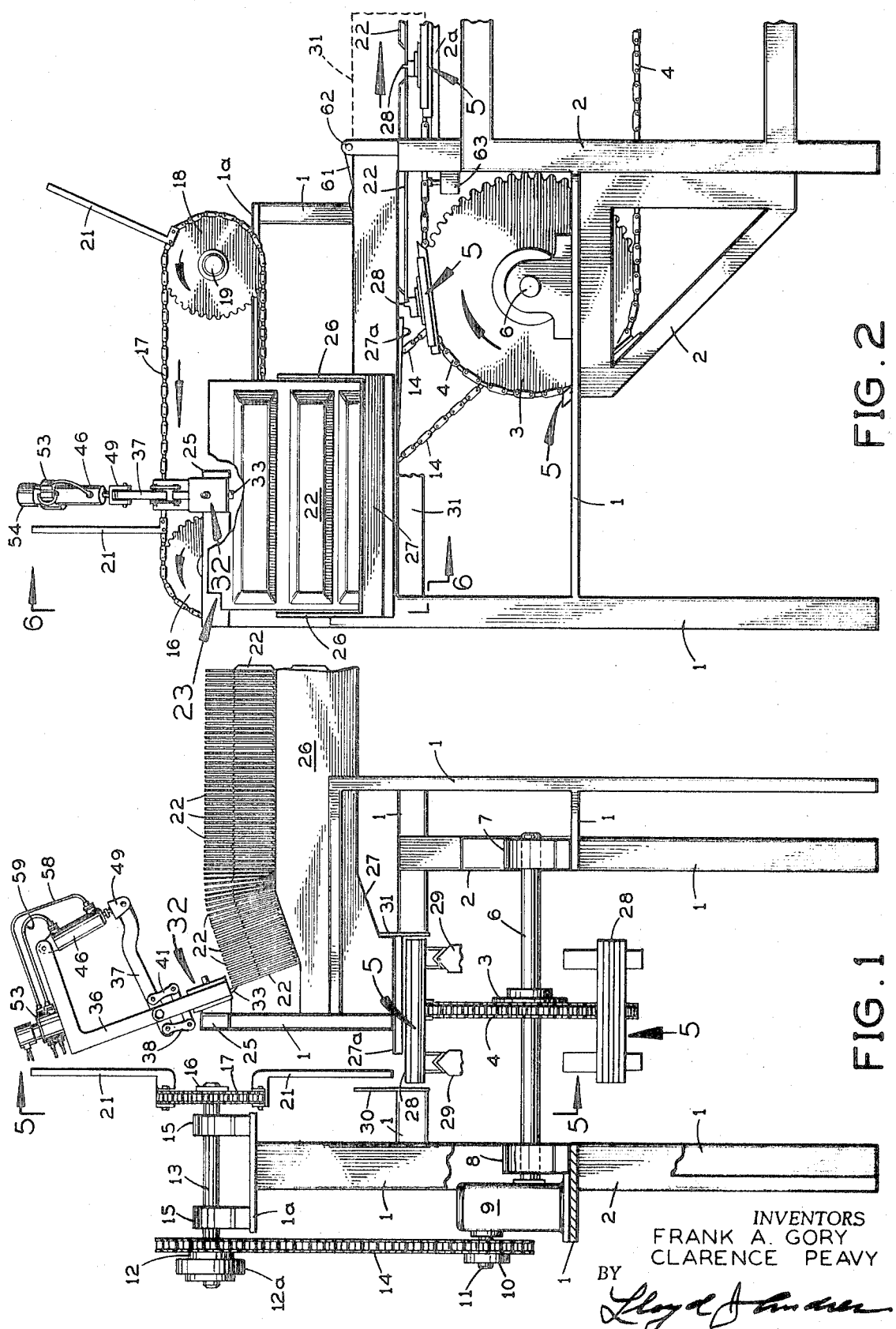

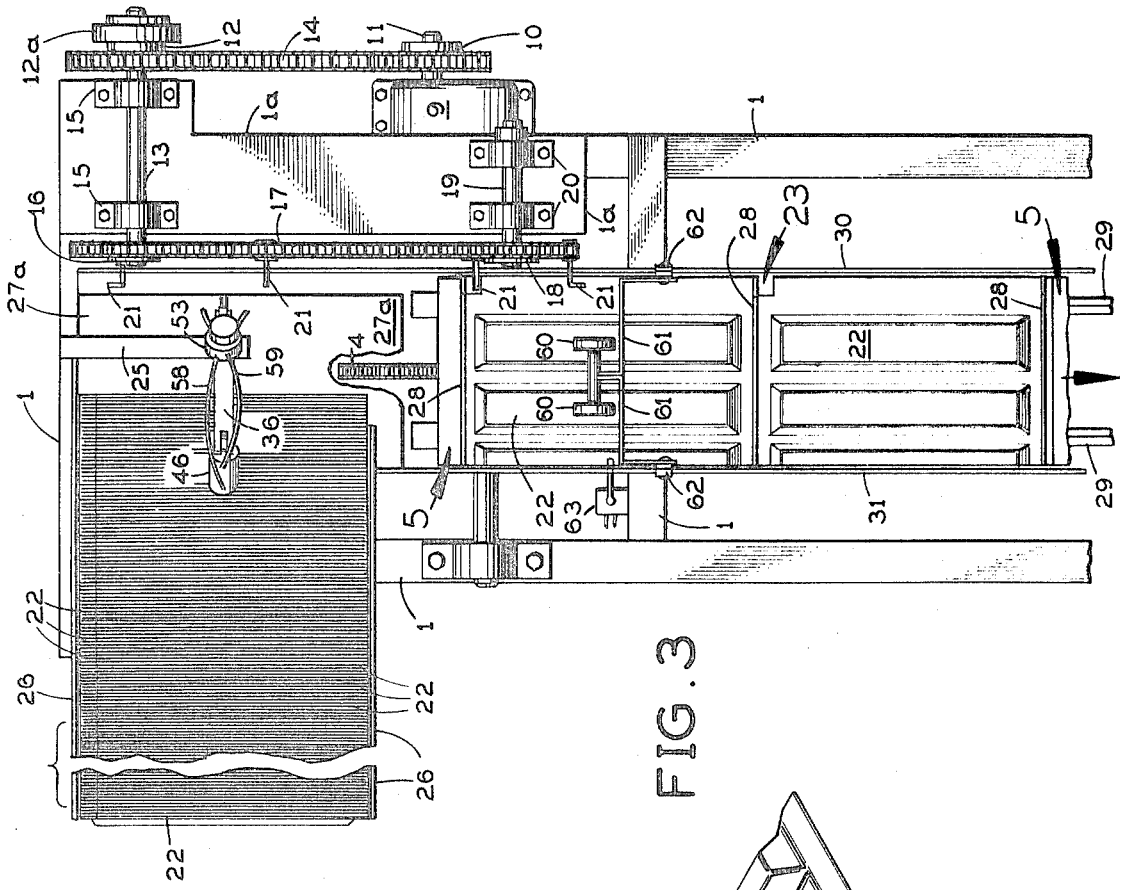
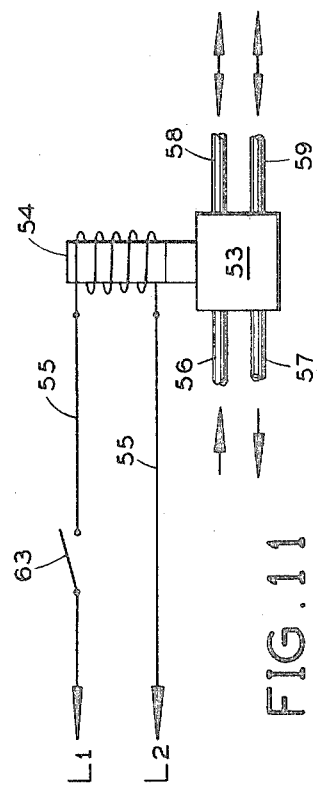
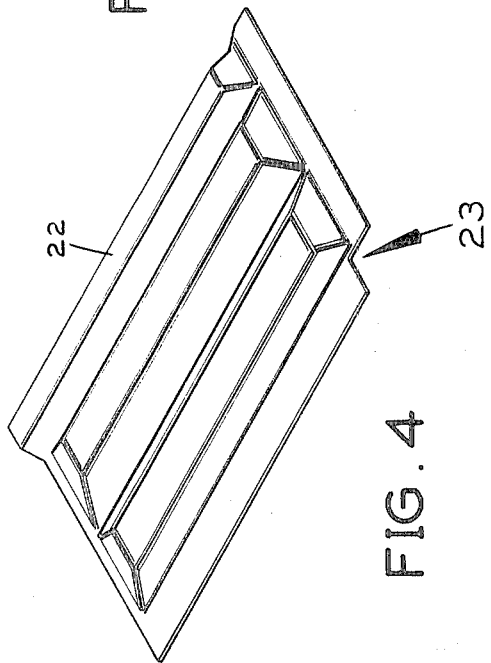

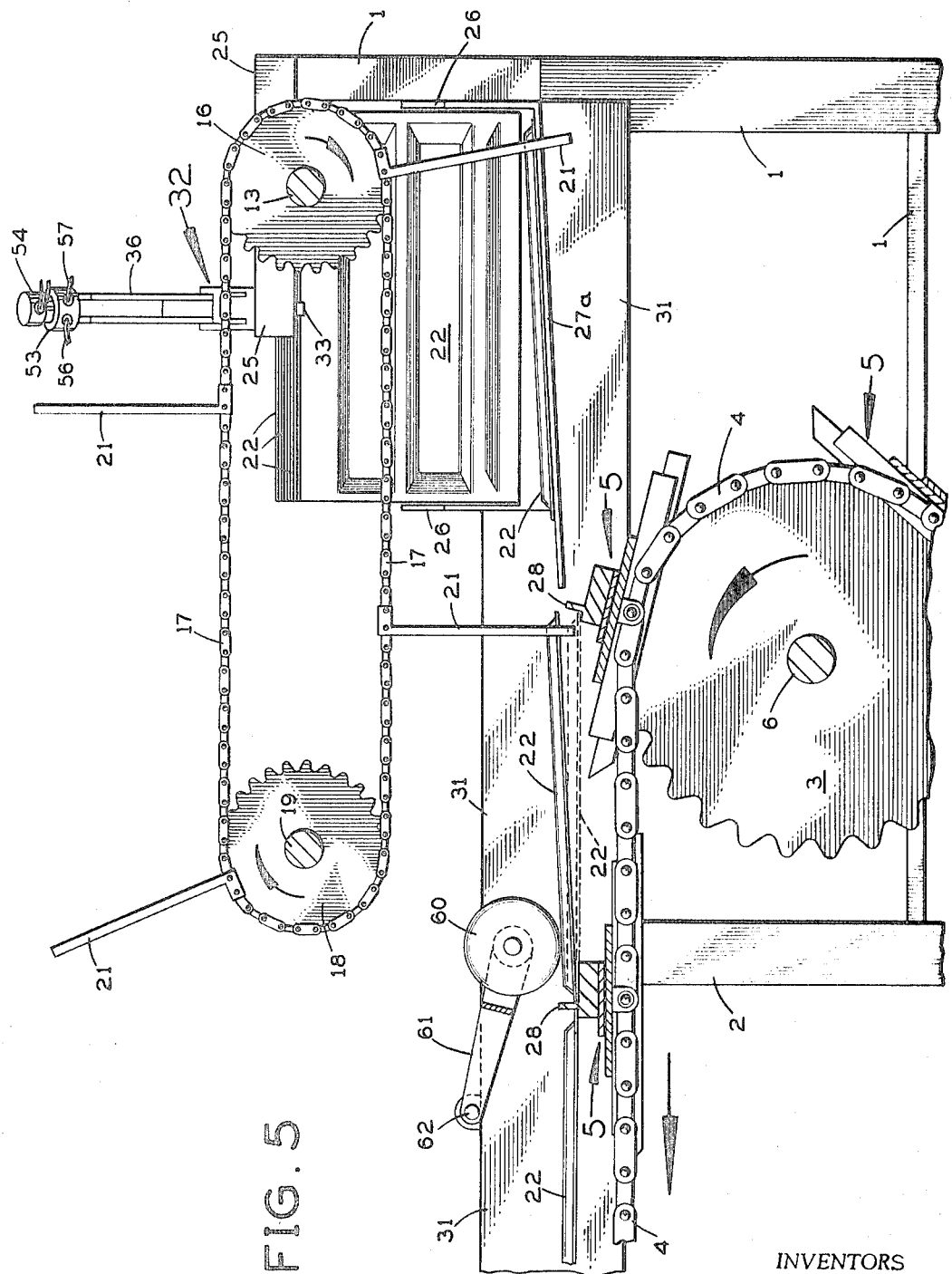

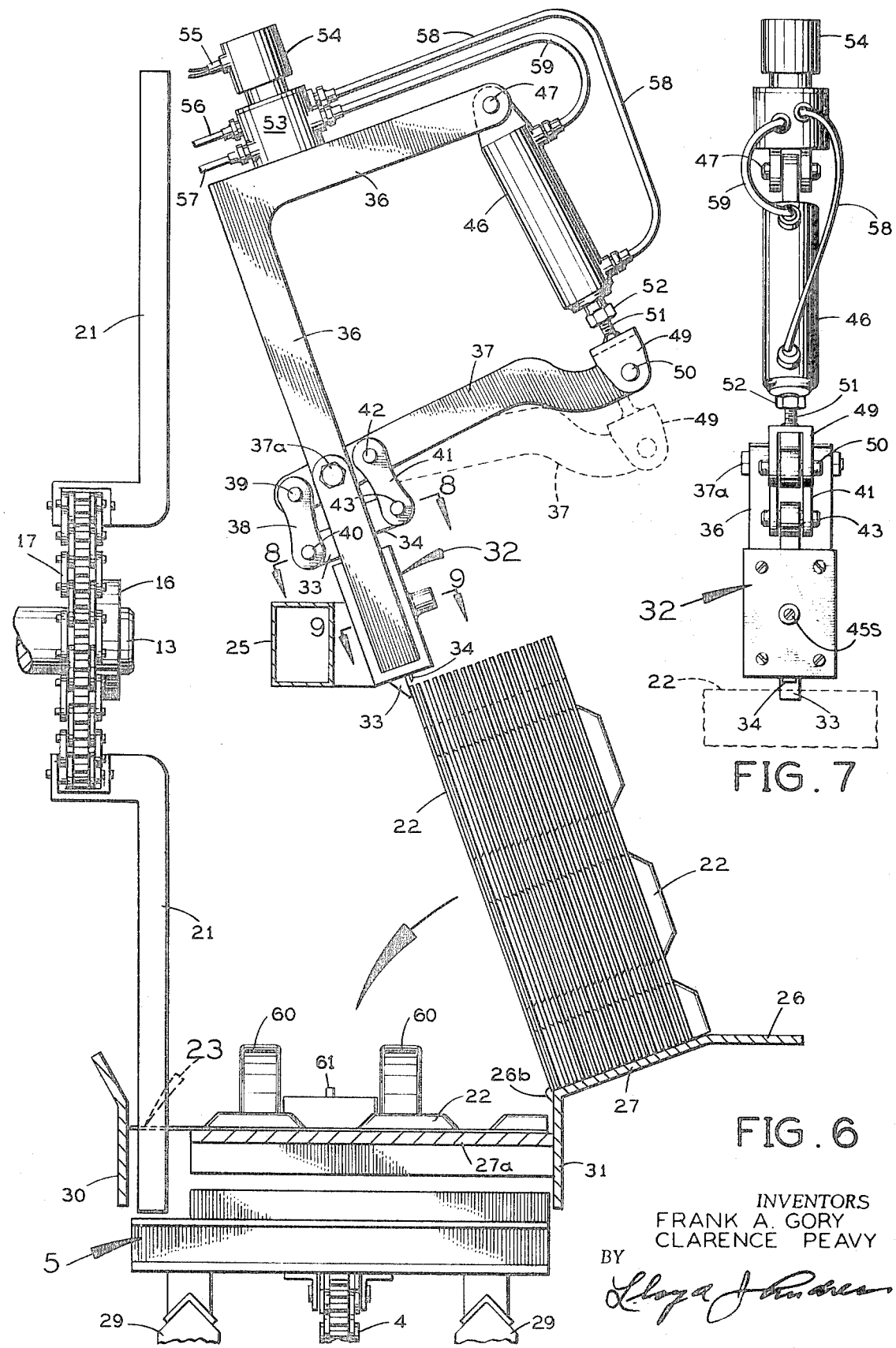

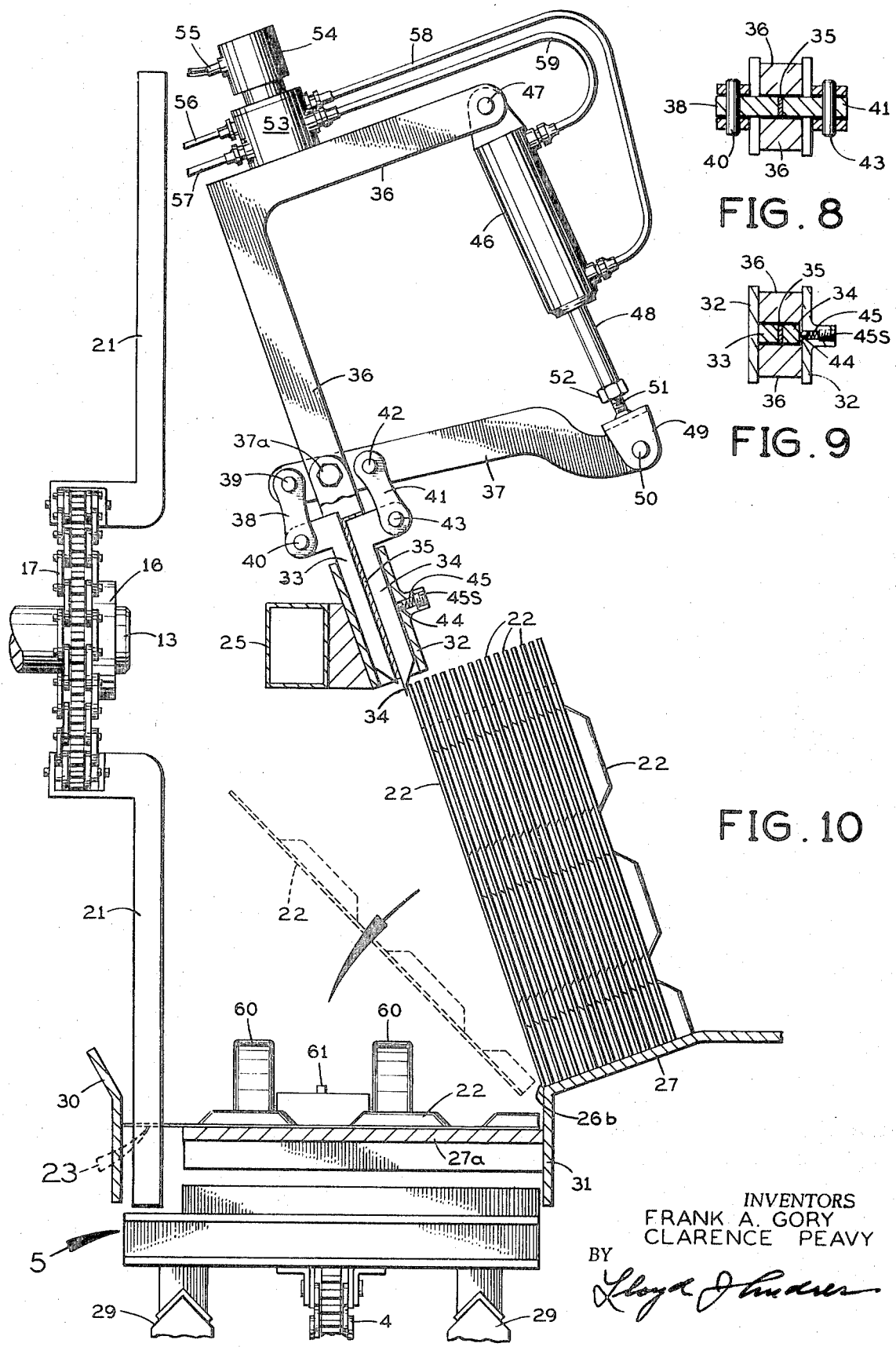

PALLET FEEDER FOR A TILE-MOLDING MACHINE

This invention relates in general to an automatic mechanism for feeding like articles and more particularly to a mechanism for sequentially feeding roof and other tile molding pallets to a tile molding machine for molding tile from soft concrete or other pliant compounds requiring subsequent curing.

Reference is had to U.S. Pat. No. 3,122,812.

Prior to this invention, each roof tile pallet was separately and sequentially manually fed to a continuously moving conveyor, which required each pallet to be precisely manually placed on the conveyor and moved through the tile-making machine for molding soft materials into shapes corresponding to the pallet. Thus, the speed of the conveyor was limited to the manual dexterity of sequentially and precisely placing pallets on the conveyor from a stack thereof, which frequently resulted in difficulties and breakdown in the molding machine due to misplacement of the pallets, and in some instances requiring a complete shutdown of the machine for replacement of damaged parts.

The present invention overcomes the above objections and disadvantages by the provision of an automatic mechanism for feeding a plurality of nested pallets manually stacked thereon to the conveyor in precise sequential spaced relation, the mechanism for this operation being the general object of the invention.

Another object of the invention is the provision of a hydraulic operated mechanism for sequentially parting the outermost pallet from a stack of pallets manually placed in the feeder hopper and precisely positioning the parted pallet to the conveyor of the molding machine.

Another object of the invention is the provision of a sequential pallet transfer mechanism driven by a power takeoff from the molding machine to transfer and precisely sequentially position pallets on the molding machine conveyor when the latter is operated.

These and other objects and advantages in one embodiment of the invention are described and shown in the following specification and drawings, in which:

FIG. 1 is an end view of the pallet-feeding machine attached to the conveyor of a tile-molding machine in reduced scale.

FIG. 2 is a right side view of the machine shown in FIG. 1.

FIG. 3 is a top plan view of the machine shown in FIG. 1.

FIG. 4 is a perspective view of a typical pallet for molding roof tile thereon.

FIG. 5 is a fragmentary enlarged cross-sectional side elevation taken through section line 5—5, FIG. 1.

FIG. 6 is an enlarged cross-sectional end elevation taken through section line 6—6, FIG. 2.

FIG. 7 is a fragmentary rear elevation of elements shown in FIG. 6.

FIGS. 8 and 9 are cross-sectional views taken through section lines 8 and 9, respectively, in FIG. 6.

FIG. 10 is the same as FIG. 6 in changed position.

FIG. 11 is a schematic diagram of the electrohydraulic elements in the mechanism.

Referring to FIGS. 1, 2, and 3, the automatic pallet feeder is secured to the input end of the conveyor portion of a tile-molding machine, which machine is not shown. A frame 1 is secured to the input end of the conveyor of the tile-molding machine, which conveyor includes a frame 2 and a sprocket 3 and an endless chain 4 which conveys a plurality of pallet carriers 5 secured at uniformly spaced intervals for the gravity retention and moving of each pallet sequentially between the carriers. The chain 4 is driven at a predetermined velocity by power means, not shown, which drives the molding machine. The conveyor sprocket shaft 6 is journaled on bearings 7 and 8, shown in FIG. 1, secured to the frame 1 and directly connected at one end to a gear transmission 9, also secured to frame 1, which is adapted to drive the pallet feeder mechanism, to be hereinafter described, at a predetermined speed in synchronism with the movement of conveyor chain 4.

A sprocket 10 is secured to the output shaft 11 of transmission 9 and adapted to rotate sprocket 12 by means of an endless chain 14. The shaft 13, driven by a compensating clutch 12a, is journaled in bearings 15—15 on frame 1 and a sprocket 16 is secured to the opposite end of shaft 13, better shown in FIG. 2. A well-known self-restoring compensating clutch 12a is positioned on shaft 13 to permit overrun compensation of the sprocket 12 and chain 14 with respect to shaft 13, to be hereinafter described.

Referring to FIGS. 1, 2, and 3, a pallet transfer chain 17 is driven by sprocket 16 and extended around sprocket 18, which sprocket is carried by shaft 19 journaled on bearings 20—20, shown in FIGS. 1, 2, and 3. The bearings 20 are retained in a suitable plate 1a which is secured to frame 1. The chain 17 has secured thereto four equispaced pallet transfer arms 21 which are positioned perpendicular to the chain, best shown in FIG. 5. The rate of speed of arms 21 is a predetermined rate greater than the rate of speed of the conveyor chair 4.

A typical rectangular contoured pallet 22 for shaping one side of a roof tile is blanked and formed from sheet metal, shown in FIG. 4, with a rectangular notch 23 in a predetermined corner there, as shown.

Referring to FIG. 1, a pallet release head 32 is supported by an upstanding bracket 25 on frame 1 and a pallet hopper 26 for receiving a plurality of nested pallets 22 and slidably supporting same for slidable movement between the parallel sides thereof. The inner portion of the bottom of the hopper is inclined downward along a portion 27 on the front thereof terminating in a stop 26b, shown in FIG. 6, for engaging a small lower margin of each pallet. The incline is sufficiently steep to permit a group of pallets thereon to be urged downward by gravity with the outermost one thereof restrained against the slide 33 of release head 24 and a stop 27b along the forward edge of portion 27 of the hopper. The happen includes a transverse platform 27a, to be hereinafter described.

Referring to FIGS. 1, 2, and 5, it is to be noted that each of the platen carriers 5 are provided with a linear transverse projection 28 with a parallel pallet support on each side thereof. Each pair of projections 28 are spaced on the conveyor to freely retain a pallet therebetween with each end portion thereof resting on a support for movement through the molding machine. Each carrier 5 is supported during the transfer of each pallet on parallel inverted V rails 29, supported by the frame 2, shown in FIGS. 1, 3, and 6.

Referring to FIG. 6, each carrier 5 is loosely retained between two parallel frame members of walls 30 and 31 which guide the pallets 22 therebetween when placed in transfer position between projections 28.

It is to be noted in FIG. 6 that arm 21 during its placement movement in notch 23 is positioned to urge the pallet into contact with the projection 28 when the carrier has moved into horizontal position. The pallet release head 32 secured to bracket 25 retains a slide member 33 longitudinally slidable from a downward holding position projecting from the lower end of said head to a retracted release position when operated. A second slide member 34 is slidably retained in head 32 parallel with slide member 33 with the lower end thereof spaced a predetermined distance from the lower end of slide member 34 by a spacer 35, shown in FIG. 6.

A slide operator bracket 36 is secured to the operating head 32 and has an operating arm 37 pivotally secured thereto, which is movable from an idle position shown in full lines to an operated position shown in dotted lines in FIG. 6. A link 38 is pivotally connected by a pin 39 to arm 37, with the opposite end of link 38 pivotally connected by pin 40 to slide member 33. A link 41 has one end thereof pivotally connected by a pin 42 to arm 37, as shown, and the opposite end of link 41 connected by a pin 43 to slide member 34, as shown in FIGS. 6 and 7.

Referring to FIG. 10, a ball 44 and a spring 45 secured in a suitable bore in head 32 by a screw 45s serves to maintain proper tensioned spacing between members 33 and 34, also shown in FIG. 9.

A double-acting hydraulic cylinder 46 is pivotally coupled to bracket 36 by a pin 47. The piston rod 48 of the cylinder is adjustably connected to clevis 49 which is pivoted to the outer end of arm 37 by a clevis pin 50. The clevis is adjustably secured to piston rod 48 by a screw 51 and held into a predetermined adjustment by a lock nut 52.

Referring to FIGS. 6 and 10, an electric-operated hydraulic valve 53 is operated by a solenoid 54 when electrically energized by dual conductors 55. An inlet conduit 56 is connected to a source of pressurized hydraulic fluid, not shown, and an outlet conduit 57 is connected to the return inlet of the source of hydraulic pressure. Conduits 58 and 59 are connected to opposite ends of the double-acting hydraulic cylinder 46, as shown. It will now be apparent from FIG. 6 that when the solenoid 54 is momentarily energized and the valve 53 operated, then the hydraulic cylinder will be energized to move the arm 37 from its solid line position to its dotted line position, which will reciprocate slide members 33 and 34 in opposite directions and release the outermost pallet from the hopper to fall by gravity and over stop 26b in the direction shown by arrow.

The quick movement of slide member 34 to the position shown in FIG. 10 will prevent the gravitation of the next adjacent pallet.

It is to be noted that those skilled in this art may substitute rotary members and drive means therefor for the slide members 33 and 34 and their associated links, with equivalent results.

When the pallet falls in a path shown in dotted lines in FIG. 10 it will descend onto shelf 27a in an arcuate path with the bracket 25 in the presynchronized path of one of the transfer arms 21 which will engage the pallet in the notch 23 thereof and move the pallet forward at a predetermined speed greater than the conveyor and engage the leading edge thereof against a projection 28 of a presynchronized position of a pallet carrier 5. As the leading edge of the pallet is moved forward against the spacer 28 of the conveyor, as shown in FIG. 5, the upper side thereof will be engaged by a pair of weighted rollers 60 which are journaled on a lever means 61 which is pivotally secured to said walls 30 and 31 by pins 62—62, also shown in FIG. 3. This downward force of the rollers assists gravity and stabilizes each pallet moving downward without rebound and into proper engagement with the next upcoming support on carrier 5 for entrapment by the projection 28 thereof.

Referring to FIG. 3, a normally open electric switch 63 is secured to frame 1 to be sequentially operated by the chain 4 in timed relation to operate the hydraulic valve 53 and release a pallet in proper pretimed relation to descend into timed relation with the movement of the conveyor and the transfer arms 21 whereby the pallet will descend between each two adjacent moving projections 28.

Referring to FIG. 11, one of the conductors 55 connecting the solenoid 54 terminates in one terminal of switch 63 and the remaining terminal of the switch is connected to a source of electric power $L_1$. The remaining conductor 55 of solenoid 54 is connected directly to the remaining source of power $L_2$. The valve 53 has an input conduit 56 connected to a source of pressurized hydraulic fluid and the conduit 57 is connected to the return input of the source of hydraulic fluid. When the solenoid 54 is deenergized the valve connects the pressurized source of fluid through conduit 59 which will hold the hydraulic cylinder in the position shown in full lines in FIG. 6. When the switch 63 is momentarily energized the valve 53 will transfer the pressurized hydraulic fluid to conduit 58 and transfer the conduit 59 to the return conduit 57, thus momentarily moving the arm 37 to the position shown in dotted lines to permit the gravity discharge of each one of the outermost pallets 22 to descend by gravity to shelf 27a for precise synchronous transfer by an arm 21 to a position between said carriers on the conveyor means.

In order to compensate for wear in the working elements of the feeder mechanism and slight differences in the length of the pallets and minor error in adjustments, the compensating clutch provides for a temporary slowing of the shaft 13, chain 17 and arms 21 as the forward end of the transferred pallet is moved against a preceding projection 28 on the carrier 5, thus preventing any disruption of the machine.

It is to be noted that an electric solenoid operated by a simple series circuit energized by switch 63 or a pneumatic cylinder with appropriate valve means may be used to replace the hydraulic cylinder 46 with equivalent results.

This invention also comprehends other modifications in construction within the teachings and spirit of the above specification.

Having described our invention, we claim:

1. A mechanism for sequentially feeding tile-molding pallets on a conveyor for transfer through a power-operated tile-molding machine comprising an endless positive drive-type conveyor means with the upper side thereof substantially horizontal and a pallet-receiving portion at the front end thereof, means forming a frame including a fixed wall on each side of said conveyor means for guiding each pallet along said conveyor means positioned in close end to end colinear relation on the upper side of said conveyor means, a conveyor transmission means connected to said machine and to said conveyor means for driving the latter when said machine is operated, a plurality of pallet carriers secured in equispaced relation around the outer periphery of said conveyor means with each of said carriers having a pallet spacer of uniform height and width normal to and transverse of the path of movement of said conveyor means including a pallet support adjacent each opposite side of said spacer for retaining each said pallet between each successive spacer with each end portion thereof resting on a corresponding support, rail means secured to said frame for engaging and slidably supporting said carriers in colinear relation under the upper side of said conveyor means, a plurality of electric switch operating abutments extending from one side of said conveyor means corresponding in number and spacing to said pallet carriers, a shelf means secured to said frame positioned adjacent the said front end of said conveyor means and sloping downward at a predetermined angle toward the said receiving portion of said conveyor means for receiving a gravity-descended pallet and holding same in position for transfer by said carriers on said conveyor means, an elongated open top pallet hopper having parallel sides and a substantially horizontal bottom with an upstanding rear side secured in said frame at right angles to said conveyor means with the front discharge end thereof positioned above and adjacent the outer edge of said shelf means for slidably holding manually inserted nested pallets in a transverse position with the side edges of said pallets resting on said bottom and the under surface thereof facing said discharge end, said hopper having an inner portion of said bottom sloping downward at a predetermined angle and terminating in an upstanding stop for normally engaging the lower marginal outer surface of the outermost one of said subplurality of pallets for holding same and said remainder of said subplurality of pallets from gravity descent, a pallet release head means secured to a bracket on said frame with the lower end thereof positioned above and in close proximity with the upper edges of said outer pallets in said hopper, a first pallet release member journaled for movement in said head from an extended downward idle position for holding the upper marginal surface of said outer pallet in said hopper against the action of gravity to a retracted position for releasing said outer pallet to descend from said hopper and said stop onto said shelf means when operated, a second pallet release member journaled for movement in said head in predetermined spaced relation from the rear of said first release member for movement from an idle retracted position to an extended holding position when operated for holding the said outer marginal surface of the next adjacent pallet and the said subplurality of pallets from gravity descent when operated, a pallet release lever pivoted for oscillation on said bracket operatively connected by a link means to said first and second release members for moving each said member in opposite direction from their said idle to their said release positions each time said lever is oscillated, an electric-controlled self-restoring operating means on said bracket for operating said release lever when momentarily energized for sequentially releasing each said pallet from said hopper when sequentially energized to descend onto said shelf means with said under surface of said pallet resting on said shelf means, a pair of substantially horizontally spaced sprockets journaled for rotation in said frame in a vertical plane parallel said conveyor and positioned above the inner side of said end portion thereof and substantially opposite the said discharge end of said hopper including an endless chain engaged around said sprockets for driving said chain with a lower portion thereof substantially parallel at the same direction as the travel of said conveyor means, a second transmission means connecting one of said sprockets with said conveyor means for driving said chain and said conveyor means simultaneously in predetermined timed relation when the latter is driven, a plurality of transfer arms secured around the periphery of said chain in equispaced relation and extending a predetermined distance normal said chain for sequentially engaging the rear edge of each said pallet deposited on said shelf means and moving same forward at a predetermined rate of speed greater than that of said conveyor means for engagement between each said spacer on successive said carriers and resting on corresponding said supports when said conveyor means is operated whereby each said pallet is transferred from said hopper to said conveyor means in end to end relation for travel through said molding machine.

2. The construction recited in claim 1 including a lever means journaled at one end thereof for oscillating movement about an axis transverse the upper side of said conveyor means, a roller journaled on the opposite end of said lever means about an axis parallel said first-mentioned axis with said roller positioned to engage and urge each said pallet in a stable position between said carriers when transferred to said receiving portion of said conveyor.

3. The construction recited in claim 1 including a speed-compensating clutch means in said second transmission means adapted and constructed to permit said clutch means to compensate and permit said transfer arms to move at a rate of speed less than said predetermined normal rate when a said arm encounters an excessive resistance of predetermined value during the transfer of a said pallet.

4. In a pallet-feeding mechanism of the character described a means forming a frame, an endless positive drive-type conveyor means with the upper side thereof substantially horizontal and a pallet-receiving portion at the front end thereof, a pallet hopper means having a downward sloping bottom terminating in an open front discharge end with an upstanding stop means on the end of said bottom for supporting a plurality of nested pallets resting upright and transversely on the lower edges thereof on the said bottom with the lower marginal face of the outermost pallet engaged against said stop means for normally restraining said outermost pallet and the remainder thereof from gravity descent, a transfer shelf secured in said frame positioned below and adjacent the said end of said bottom of said hopper means and in proximity to said receiving portion of said conveyor means, a pallet release head secured on said frame with the lower end thereof positioned above and in close proximity with the upper edges of the outermost two of said nested pallets, a first pallet release slide journaled for reciprocation in said head from an extended downward idle position and adapted to hold the upper outer marginal surface of said outermost pallet against the action of gravity to a retracted position for releasing said outermost pallet to descend by gravity and said stop means downward in an arcuate path onto said shelf means when operated, a second pallet slide journaled for simultaneous movement parallel said first slide in said head in predetermined spaced relation from the rear of said first slide for movement from an idle retracted position to an extended holding position for engaging said outer marginal surface of the next adjacent pallet for holding same and the remainder of said pallets from gravity descent when operated, a pallet release lever pivoted on said bracket for movement from an idle to a release position connected by a pair of pivoted link means to said first and second slides respectively for simultaneously moving said slides in opposite directions and sequentially releasing each outermost said pallet to gravitate in said arcuate path from said first slide and said stop means from said hopper means onto said shelf means when said lever is sequentially oscillated each cycle from said idle to said release position and return to said idle position.

5. The construction recited in claim 4 including a double-acting hydraulic cylinder actuator secured to said frame operatively connected to said release lever for oscillating the latter one said cycle when said actuator is momentarily energized for releasing each of said pallets.

6. The construction recited in claim 4 including a pneumatic cylinder secured to said frame with the piston rod thereof operatively connected to said release lever, spring means biased between said frame and said lever for normally urging the latter and said piston rod into their idle positions, said cylinder adapted and constructed to oscillate said lever one said cycle when said cylinder is momentarily energized with compressed air for releasing each of said pallets.

7. The construction recited in claim 4 including an electromagnetic solenoid secured to said frame with the movable core thereof pivotally connected to said release lever, spring means biased between said frame and said lever for normally urging the latter and said core into their idle positions for oscillating said lever one said cycle when said solenoid is momentarily energized for releasing each of said pallets.